United States Patent [19]

Shirasaki et al.

[11] 4,145,608
[45] Mar. 20, 1979

[54] ROTATIONAL REFERENCE POSITION DETECTING APPARATUS

[75] Inventors: Shinji Shirasaki, Kariya; Takashi Yamada, Anjo; Hiroyasu Fukaya, Nagoya; Yukio Sakakibara, Anjo, all of Japan

[73] Assignee: Nippondenso Co., Ltd., Kariya, Japan

[21] Appl. No.: 833,042

[22] Filed: Sep. 14, 1977

[30] Foreign Application Priority Data

Oct. 15, 1976 [JP] Japan .................................. 51-124267

[51] Int. Cl.$^2$ ................................................ G01D 5/34
[52] U.S. Cl. ........................... 250/231 SE; 250/237 G
[58] Field of Search ......... 250/231 R, 231 SE, 237 G, 250/209, 214 R; 356/169; 324/175; 340/347 P

[56] References Cited

U.S. PATENT DOCUMENTS

| | | |
|---|---|---|
| 3,814,934 | 6/1974 | Mesh et al. ............................ 324/175 |
| 3,999,064 | 12/1976 | Kramer ................................ 340/347 P |
| 4,064,504 | 12/1977 | Lepetit et al. ................... 250/231 SE |

*Primary Examiner*—David C. Nelms
*Attorney, Agent, or Firm*—Cushman, Darby & Cushman

[57] ABSTRACT

A crankshaft rotational reference position detecting apparatus is adapted for use with ignition timing control systems for internal combustion engines. The apparatus comprises a rotor disk fixedly mounted on the crankshaft of an engine and having rotational angle information indicating slits and a rotational reference position indicating mark which are formed along the periphery thereof, a first sensor for detecting each rotational angle information indicating slit and generating a first pulse signal corresponding thereto, the first sensor producing no first pulse signal when a rotational reference position is detected, a second sensor located at a position displaced from the first sensor in a desired rotational direction and adapted to generate a second pulse signal delayed in phase from the first pulse signal, a storage device responsive to the second pulse signals to store the output level of the first sensor, and a detection circuit responsive to a change in the output of the storage device which is indicative of the detection of the rotational reference position by the first sensor so as to generate a reference position detection pulse. In the event that the rotor disk is rotated in the reverse direction, the detection of the rotational reference position does not result in the generation of any reference position detection pulse.

4 Claims, 6 Drawing Figures

ROTATIONAL REFERENCE POSITION DETECTING APPARATUS

BACKGROUND OF THE INVENTION

FIELD OF THE INVENTION

The present invention relates to a rotational reference position detecting apparatus well suited for use in the ignition timing control systems for internal combustion engines as a means for detecting a rotational reference position of the engine crankshaft and the degrees of crankshaft rotation from the rotational reference position.

SUMMARY OF THE INVENTION

A principal object of the present invention is to provide a rotational reference position detecting apparatus comprising a rotor disk provided along its outer periphery with a plurality of rotational angle informations arranged at intervals of a unit rotational angle and a reference position information in the form of a reference position with a longer interval than the former, and first and second sensors for detecting the informations and generating first and second pulse signals displaced in phase from one another, whereby a reference pulse is generated in synchronism with each change in the second pulse signal level at the time of occurrence of a first pulse signal indicative of the reference position information, namely, a reference pulse is generated each time the reference position reaches the position of the first sensor during the rotation of the rotor disk in the forward direction, while the occurrence of any reference pulse is prevented during the rotation of the rotor disk in the reverse direction.

Further objects, features and advantages of the present invention will be apparent from the following description taken in conjunction with the accompanying drawings.

DESCRIPTION OF THE PREFERRED EMBODIMENT

Figure 1:
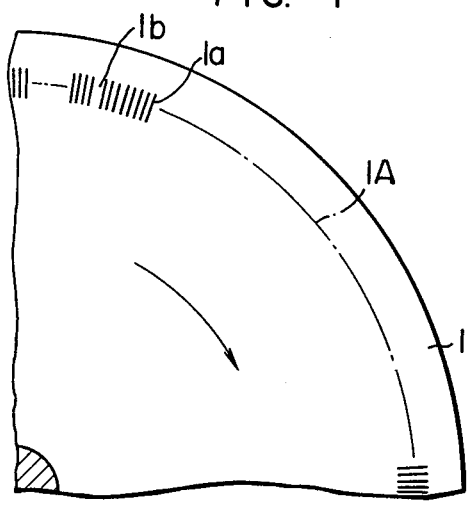
FIG. 1 is a partial enlarged plan view of a rotor disk used in a rotational reference position detecting apparatus according to the present invention.
Figure 2:
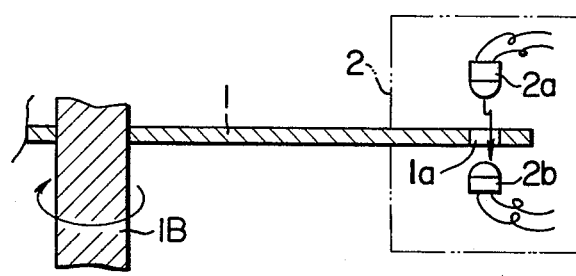
FIG. 2 is a schematic sectional view showing the arrangement of the principal parts of the apparatus of this invention.

Referring now to FIG. 1 showing the construction of a rotor disk used in the apparatus of this invention, a rotor disk 1 is a disk provided with 359 slits 1a of about 0.5° width arranged over the entire circumference of a slit area 1A along the outer periphery thereof, and its rotational reference position 1b contains a single slit portion which is not slitted. Thus, each slit 1a constitutes rotational angle information and the reference position 1b constitutes rotational reference position information. As shown in the schematic diagram of FIG. 2, the center part of the rotor disk 1 is fixedly mounted to a crankshaft 1B of an internal combustion engine, and a first photo sensor 2 is disposed at a predetermined fixed position above the slit area 1A along the outer periphery of the rotor disk 1. The first photo sensor 2 comprises a photo emitter 2a which projects light to the slit area 1A from its upper surface to its lower surface and a photo receiver 2b which receives the light that has passed through each slit 1a. When the rotor disk 1 is rotated by the revolution of the crankshaft 1B in the direction of the arrow in the Figure, the light from the photo emitter 2a is intercepted as the slits 1a move past the photo sensor 2 so that each time the degree of rotation of the rotor disk 1 reaches 1°, the photo receiver 2b produces an intermittent signal.

Figure 3:
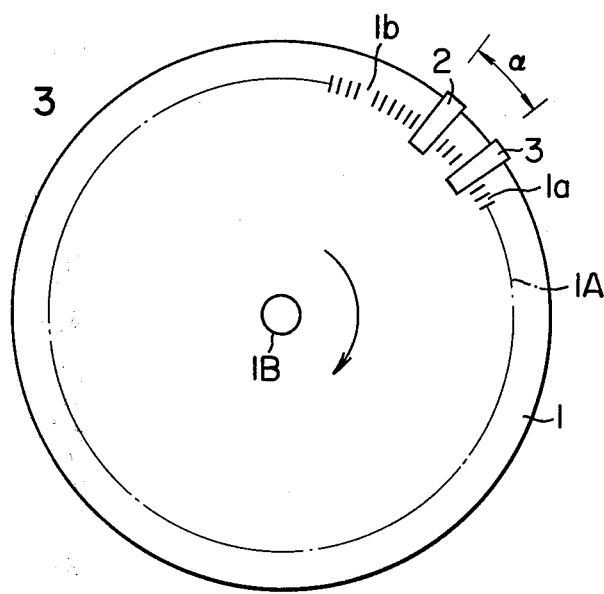
FIG. 3 is a schematic plan view showing the arrangement of the sensors used in the apparatus of this invention.

As shown in the schematic diagram of FIG. 3, a second photo sensor 3 which is slightly displaced from the first photo sensor 2 is fixedly mounted at a position which is displaced by an angle $\alpha$ ($4° < \alpha < 5°$) from the first sensor 2 in the direction of rotation of the rotor disk 1. It is also arranged so that the first sensor 2 begins the detection of one of the slits 1a prior to the detection of another of the slits 1a by the second sensor 3.

Figure 4:
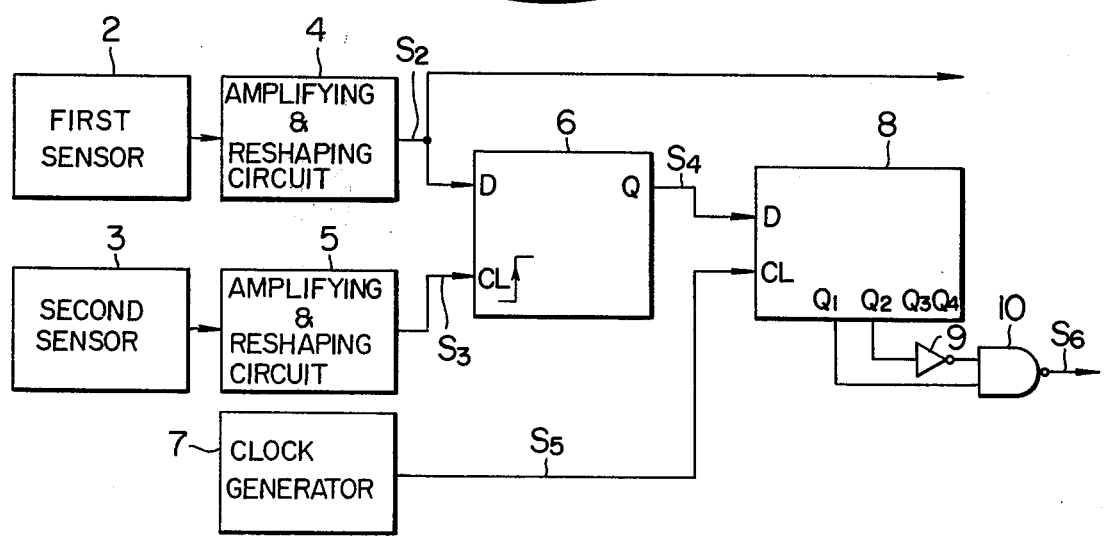
FIG. 4 is a block diagram showing the circuit construction of the apparatus of this invention.

Shown in FIG. 4 is electric circuitry which is responsive to the intermittent signals from the first and second sensors 2 and 3 for generating a reference pulse when the rotor disk 1 is rotated in the clockwise direction or forward direction and the reference position 1b on the rotor disk 1 reaches and moves past the position of the first sensor 2. In the block diagram of FIG. 4, numeral 4 designates an amplifying and reshaping circuit for amplifying and reshaping the intermittent signals from the first sensor 2 into pulse signals $S_2$, 5 an amplifying and reshaping circuit for amplifying and reshaping the intermittent signals from the second sensor 3 into pulse signals $S_3$, 6 a D-type flip-flop constituting a detection circuit wherein the pulse signals $S_2$ and $S_3$ are respectively received at a data input D and a clock input CL, whereby in response to the positive transition of the pulse signals $S_3$ at the clock input CL, the high or low level of the pulse signals $S_2$ at the data input D is stored and the resulting stored signals $S_4$ is generated at an output Q. Numeral 7 designates a clock generator for generating clock pulses of a fixed frequency which is predetermined sufficiently high as compared with the frequency of the pulse signals $S_2$ and $S_3$ which would be obtained with the engine being operated at the maximum rotational speed. Numeral 8 designates a shift register wherein in response to the clock pulses $S_5$ from the clock generator 7, the stored signal $S_4$ from the output Q of the D-type flip-flop 6 is sequentially shifted and produced at outputs $Q_1$, $Q_2$, $Q_3$ and $Q_4$. Numeral 9 designates an inverter for inverting the $Q_2$ output of the shift register 8, 10 an NAND gate for performing the NAND logic operation on the output signal of the inverter 9 and the $Q_1$ output of the shift register 8 to generate a reference pulse $S_6$ which goes to the low level when both the output signal of the inverter 9 and the $Q_1$ output of the shift register 8 go to the high level.

With the construction described above, the operation of the apparatus will now be described with reference to the signal waveform diagram of FIG. 5. When the engine is operated so that the crankshaft 1B revolves, the rotor disk 1 is rotated in the clockwise direction or forward direction. As a result, the slits 1a in the slit area 1A of the rotor disk 1 move across and past the light path of the first and second sensors 2 and 3. Since each slit 1a of the rotor disk 1 represents a crank rotational angle of 1°, each of the first and second sensors 2 and 3 generates an intermittent signal in response to every one degree of rotation of the rotor disk 1, and the intermittent signals are then amplified by the amplifying and reshaping circuits 4 and 5 which in turn generate respectively the first and second pulse signals $S_2$ and $S_3$ shown respectively in ($S_2$) and ($S_3$) of FIG. 5. One cycle period of the first and second pulse signals $S_2$ and $S_3$ represents one degree of rotation of the rotor disk 1, and the high level of these signals represents the slit width of about 0.5°.

Figure 5:
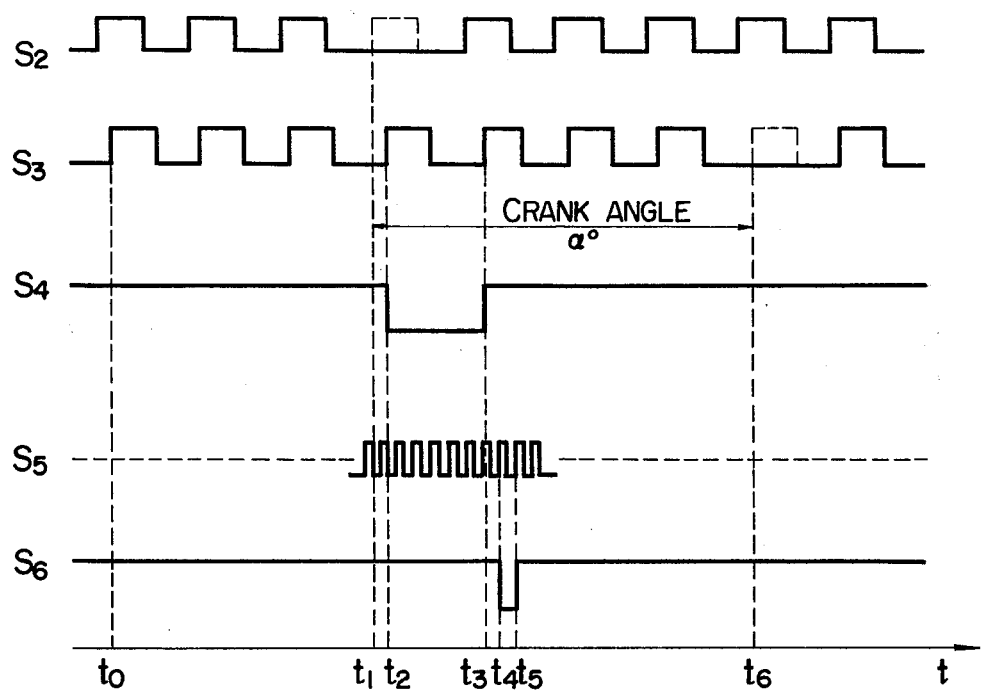
FIG. 5 is a signal waveform diagram useful in explaining the operation of the circuits shown in FIG. 4.

Then, as the second pulse signal $S_3$ goes to the high level at a time $t_o$, due to the fact that the first pulse signal $S_2$ applied to the data input of the D-type flip-flop 6 has gone to the high level, the D-type flip-flop 6 stores this high level, thus generating at its output Q the high level stored signal $S_4$ shown in ($S_4$) of FIG. 5. Consequently, the stored signal $S_4$ from the D-type flip-flop 6 remains at the high level until the first sensor 2 detects the reference position 1b where the slit 1a is not provided. As a result, the shift register 8 shifts this high level stored signal $S_4$ from the output $Q_1$ to the output $Q_4$ in synchronism with the clock pulses $S_5$ shown in ($S_5$) of FIG. 5, so that its $Q_1$, $Q_2$ and $Q_3$ outputs go to the high level, and the output signal of the inverter 9 goes to the low level, thus causing the output signal $S_6$ of the NAND gate 10 to remain at the high level as shown in ($S_6$) of FIG. 5.

Thereafter, as the reference position 1b on the rotor disk 1 reaches the position of the first sensor 2 at a time $t_1$, due to the absence of any slit in the position 1b, the light of the first sensor 2 is continuously intercepted with the result that the first pulse signal $S_2$ does not go to the high level and thus remains at the low level. Since the second sensor 3 generates an intermittent signal in response to every one degree of rotation of the rotor disk 1 during this interval, when the second pulse signal $S_3$ next goes to the high level at a time $t_2$ following the time $t_1$, the D-type flip-flop 6 stores the low level of the first pulse signal $S_2$ applied to its data input D, and consequently the resulting stored signal $S_4$ at its output Q changes from the high level to the low level as shown in ($S_4$) of FIG. 5. This low level stored signal $S_4$ is then applied to the shift register 8 so that in synchronism with the clock pulses $S_5$ from the clock generator 7, the $Q_1$ output first goes to the low level and then the $Q_2$, $Q_3$ and $Q_4$ outputs successively go to the low level. With the $Q_1$ output now at the low level, the output signal $S_6$ of the NAND gate 10 remains at the high level irrespective of the output signal of the inverter 9. Then, when the second pulse signal $S_3$ goes to the high level at a time $t_3$, due to the fact that the first pulse signal $S_2$ applied to the data input of the D-type flip-flop 6 is at the high level, this high level is stored by the D-type flip-flop 6 and the resulting stored signal $S_4$ at its output Q changes from the low level to the high level again. This high level stored signal $S_4$ is applied to the shift register 8 so that its $Q_1$ output goes to the high level and the other $Q_2$, $Q_3$ and $Q_4$ outputs go to the low level at a time $t_4$ at which the first one of the clock pulses $S_5$ from the clock generator 7 arrives after the level change of the signal $S_4$ from the low level to the high level. Consequently, both the output signal of the inverter 9 and the $Q_1$ output go to the high level, and the output signal $S_6$ of the NAND gate 10 changes from the high level to the low level. Then, as the next clock pulse $S_5$ arrives at a time $t_5$, both the $Q_1$ and $Q_2$ outputs of the shift register 8 go to the high level, with the result that the output signal of the inverter 9 goes to the low level and the output signal $S_6$ of the NAND gate 10 changes from the low level to the high level.

Thereafter, when the reference position 1b arrives at the position of the second sensor 3 at a time $t_6$, the application of pulse to the clock input of the D-type flip-flop 6 is prevented only once, so that the resulting stored signal $S_4$ at the output Q of the D-type flip-flop 6 remains at the high level and no reference pulse is generated.

In this way, each time the reference position 1b on the rotor disk 1 reaches the position of the first sensor 2, the NAND gate 10 generates a low level reference pulse $S_6$.

On the other hand, when the rotor disk 1 is rotated in the counterclockwise direction or reverse direction, the phase relation of the first and second pulse signals $S_2$ and $S_3$ with each other is reversed, thus making it possible to utilize this fact for reverse rotation preventing purposes. The reason is that when the rotor disk 1 is rotated in the reverse direction, the time of positive going transition of the second pulse signal $S_3$ precedes that of the first pulse signal $S_2$ so that each time the D-type flip-flop 6 starts its storage operation, its data input always goes to the low level and consequently the $Q_1$ output of the shift register 8 remains at the low level.

Figure 6:
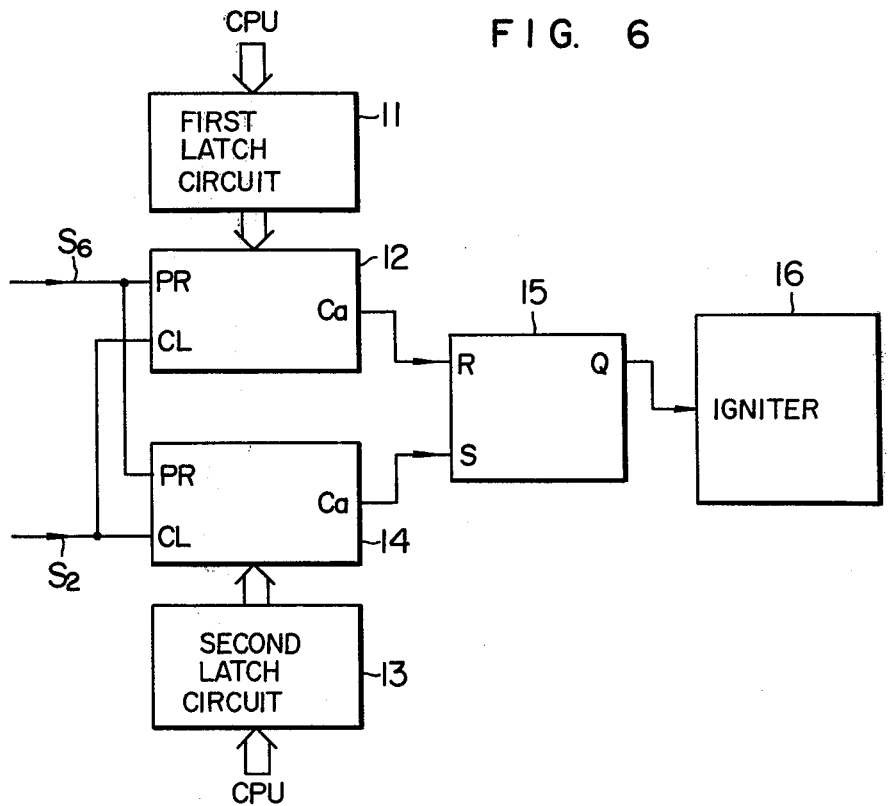
FIG. 6 is a block diagram showing an ignition timing control system with which the apparatus of this invention can be used.

Referring now to FIG. 6, there is illustrated a block diagram showing a detailed construction of a control system which is designed to control the ignition timing of an internal combustion engine by utilizing the above-mentioned reference pulse $S_6$ and in which the desired ignition advance angle is computed by a central processing unit or CPU (not shown) in accordance with various parameters, such as, engine speed, engine load, etc., so as to obtain ignition data indicative of the rotational angle from the reference position of the crankshaft to the ignition point as well as the dwell angle data indicative of the rotational angle from the point of ignition to the point of starting current supply to the ignition coil. Numeral 11 designates a first latch circuit for storing the ignition data from the CPU, 12 a first preset counter which is adapted to be preset by a reference pulse to the ignition data stored in the first latch circuit 11 and also adapted to integrate first pulse signals $S_2$ each thereof representing one degree of rotation, thereby generating a first carry signal at its carry output Ca when the rotational angle indicated by the ignition data is reached. Numeral 13 designates a second latch circuit for storing the dwell angle data from the CPU, 14 a second preset counter adapted to be preset by the reference pulse $S_6$ to the dwell angle data stored in the second latch circuit 13 and also adapted to integrate first pulse signals $S_2$ each thereof representing one degree of rotation, thereby generating a second carry signal at its carry output Ca when the rotational angle indicated by the dwell angle data is reached. Numeral 15 designates an R-S flip-flop adapted to be reset by the first carry signal from the first preset counter 12 causing its Q output to go to the low level and to be set by the second carry signal from the second preset counter 14 causing its Q output to go to the high level, whereby an igniter 16 is caused to ignite when the Q output changes from the high level to the low level in response to the first carry signal, and when the Q output goes to the high level current is supplied to the ignition coil of the igniter 6 thus placing it in condition for the next ignition.

With the construction described above, the ignition of the engine by the igniter 6 can be properly controlled in response to the first pulse signals $S_2$ and the reference pulse $S_6$ which are respectively generated in accordance with the rotational angle information and the reference position information of the rotor disk 1, and moreover the ignition timing as well as the dwell angle can be controlled without any time computation in accordance with data indicating the rotational angle from the reference position.

While, in the above-described embodiment, the reference position 1b of the rotor disk 1 is in the form of outer peripheral portion without any slit, the reference position 1b may be in the form of a width slit corresponding to 2 degrees of rotation, and in this case the desired reference pulse $S_6$ can also be obtained as in the case of the above-described embodiment by providing inverters for inverting the first and second pulse signals $S_2$ and $S_3$ of FIG. 4 and applying the resulting first and second inverted signals $S_2'$ and $S_3'$ to the D-type flip-flop 6.

Further, while each of the first and second sensors 2 and 3 is of a photoelectric type which detects on and off of light, first and second sensors of a magnetic type may for example be used in combination with the rotor disk 1 consisting of a magnetic rotor disk provided along the outer periphery thereof with a plurality of magnetic poles arranged at intervals of 1 degree of rotation. In this case, it is necessary to remove the magnetic pole at the reference position.

Still further, the rotor disk 1 may be in the form of a disk having a toothed outer periphery with the tooth at the reference position being removed. In this case, it is necessary to use an electromagnetic pickup for each of the first and second sensors.

It will thus be seen from the foregoing that in accordance with the present invention, a rotor disk is provided along the outer periphery thereof with a plurality of rotational angle informations arranged at intervals of a unit rotational angle and a reference position information identical with the former excepting a longer interval of a reference position, and in response to the rotation of the rotor disk the informations along the outer periphery of the disk are detected by first and second sensors to generate first and second pulse signals which are out of phase in such a manner that a reference pulse is generated from a detection circuit in synchronism with the level change of the second pulse signal from the second sensor occurring at the time of detection by the first sensor of the reference position on the rotor disk, whereby no reference pulse is generated when the rotor disk is rotating in the reverse direction but a reference pulse is generated each time the reference position reaches the position of the first sensor while the rotor disk is rotating in the forward direction, thus making the apparatus of this invention well suited for use as a means for detecting a rotational reference position of the crankshaft of an internal combustion engine so as to control the ignition timing of the engine.

We claim:

1. A rotational reference position detecting apparatus for use in an engine system comprising:
   a rotor disk coupled with an engine to be rotated thereby;
   a plurality of equispaced means provided on said rotor disk circularly except at a position indicative of the rotational reference position of said engine;
   a first sensor, positioned adjacent to said rotor disk, for generating a first signal which changes the signal level thereof in response to the passing of each of said equispaced means;
   a second sensor positioned adjacent to said rotor disk for generating a second signal which changes the signal level thereof in response to the passing of each of said equispaced means, said second sensor being apart from said first sensor such that the level change of said first signal precedes the level change of said second signal; and
   a detection circuit, connected to said first and second sensors, for generating a reference pulse by detecting the signal level of said first signal at each level change of said second signal, said reference pulse representing that said engine is rotated in a predetermined direction and to said rotational reference position.

2. A rotational reference position detecting apparatus according to claim 1, wherein said plurality of equispaced means include 359 slits each of which extends radially, and wherein each of said first and second sensors includes a photo emitter and a photo receiver which are positioned respectively at one and the other side surfaces of said rotor disk.

3. A rotational reference position detecting apparatus according to claim 1, wherein said detection circuit includes:
   a store circuit, connected to said first and second sensors, for storing the signal level of said first signal at each level change of said second signal;
   a clock circuit for generating a train of clock pulses at a fixed frequency which is higher than the highest one of said first signal;
   a shift circuit, connected to said store and clock circuits and having a plurality of output terminals, for sequentially producing output signals indicative of said first signal stored by said store circuit at said output terminals in response to said clock pulses; and
   a logic circuit, connected to said shift register, for subjecting some of said sequentially produced output signals to a predetermined logical operation to thereby produce said reference pulse which has a time width shorter than that of said first signal.

4. A rotational reference position detecting apparatus for use in an engine system comprising:
   a rotor disk coupled with the crankshaft of an engine to be rotated therewith and circularly provided with a plurality of rotational angle informations each of which is indicative of the unit rotational angle of said crankshaft and with a reference position information which is indicative of the rotational reference position of said crankshaft, said reference position information having a predetermined width which is two times wider than that of each of said rotational angle informations;
   a first sensor, positioned to face said rotational angle informations and said reference position information, for generating a first pulse signal only when each of said rotational angle informations passes therethrough;
   a second sensor, positioned to face said rotational angle informations and said reference position information, for generating a second pulse signal only when each of said rotational angle informations passes therethrough, said second sensor being positioned apart from said first sensor so that said second pulse signal is started to be generated after said first pulse signal is started to be generated; and a detection circuit, connected to said first and second sensors, for generating a reference pulse by detecting the absence of said first pulse signal at the start of said second pulse signal, said reference pulse indicating that said engine is rotated in a predetermined direction and to said rotational reference position.

* * * * *